United States Patent [19]

Oldendorf et al.

[11] Patent Number: 4,890,246

[45] Date of Patent: Dec. 26, 1989

[54] ELECTRONIC BALANCE WITH CALIBRATING SYSTEM

[75] Inventors: Christian Oldendorf, Göttingen; Christoph Berg, Adelebsen; Franz-Josef Melcher, Hardegsen, all of Fed. Rep. of Germany

[73] Assignee: Sartorius GmbH, Fed. Rep. of Germany

[21] Appl. No.: 122,696

[22] Filed: Nov. 19, 1987

[30] Foreign Application Priority Data

Nov. 20, 1986 [DE] Fed. Rep. of Germany ....... 3639521

[51] Int. Cl.$^4$ .......................... G01G 3/18; G01G 23/01
[52] U.S. Cl. .................. 364/567; 177/25.13; 177/210 EM; 364/571.03
[58] Field of Search ............. 364/567, 571.01, 571.03; 177/50, 212, 226, 210 EM, 25.13

[56] References Cited

U.S. PATENT DOCUMENTS

| | | | |
|---|---|---|---|
| 4,300,647 | 11/1981 | Knothe et al. | 177/212 |
| 4,343,373 | 8/1982 | Stadler et al. | 177/50 |
| 4,425,975 | 1/1984 | Lüchinger | 177/50 |
| 4,457,386 | 7/1984 | Schett et al. | 177/212 |
| 4,464,725 | 8/1984 | Briefer | 364/567 X |
| 4,487,280 | 12/1984 | Knothe et al. | 177/212 |
| 4,489,800 | 12/1984 | Nufer et al. | 177/212 |
| 4,627,505 | 12/1986 | Kunz | 177/212 X |
| 4,656,599 | 4/1987 | Knothe et al. | 364/567 |

FOREIGN PATENT DOCUMENTS 3144103 6/1982 Fed. Rep. of Germany ...... 364/567

Primary Examiner—Felix D. Gruber
Attorney, Agent, or Firm—Eric P. Schellin

[57] ABSTRACT

In high-resolution electric balances a certain residual temperature coefficient remains even with a good correction of the temperature-dependent errors of the measured value sensor. The invention therefore is with respect to a balance with a built-in calibrating weight (standard) which responds with a new calibration switching in said calibrating weight if a given temperature changes has been exceeded since the last calibration. To this end, the balance comprises in microprocessor digital signal processing unit a separate memory area in which the output signal representing temperature value of a temperature sensor is stored during the calibrating process and also comprises a comparator which upon instruction compares the instantaneous output signal of the temperature sensor which the value stored in this separate memory area. If this difference exceeds a given amount, a signal element indicative of need to recalibrate using the calibrating weight is actuated. In addition, an elapsed time indicator can also be present which also actuates the signal element after the passage of a given time since the last calibration.

In an advanced embodiment the apparatus will automatically cause recalibration to physically take place by having the signal processing unit control a motor which will switch the calibrating weight into weighing position. Said automatic recalibration taking place instead of or in addition to actuation of the signal element. Other physical science inputs can also be sensed and utilized by themselves or in combination in determining when recalibration should occur.

12 Claims, 4 Drawing Sheets

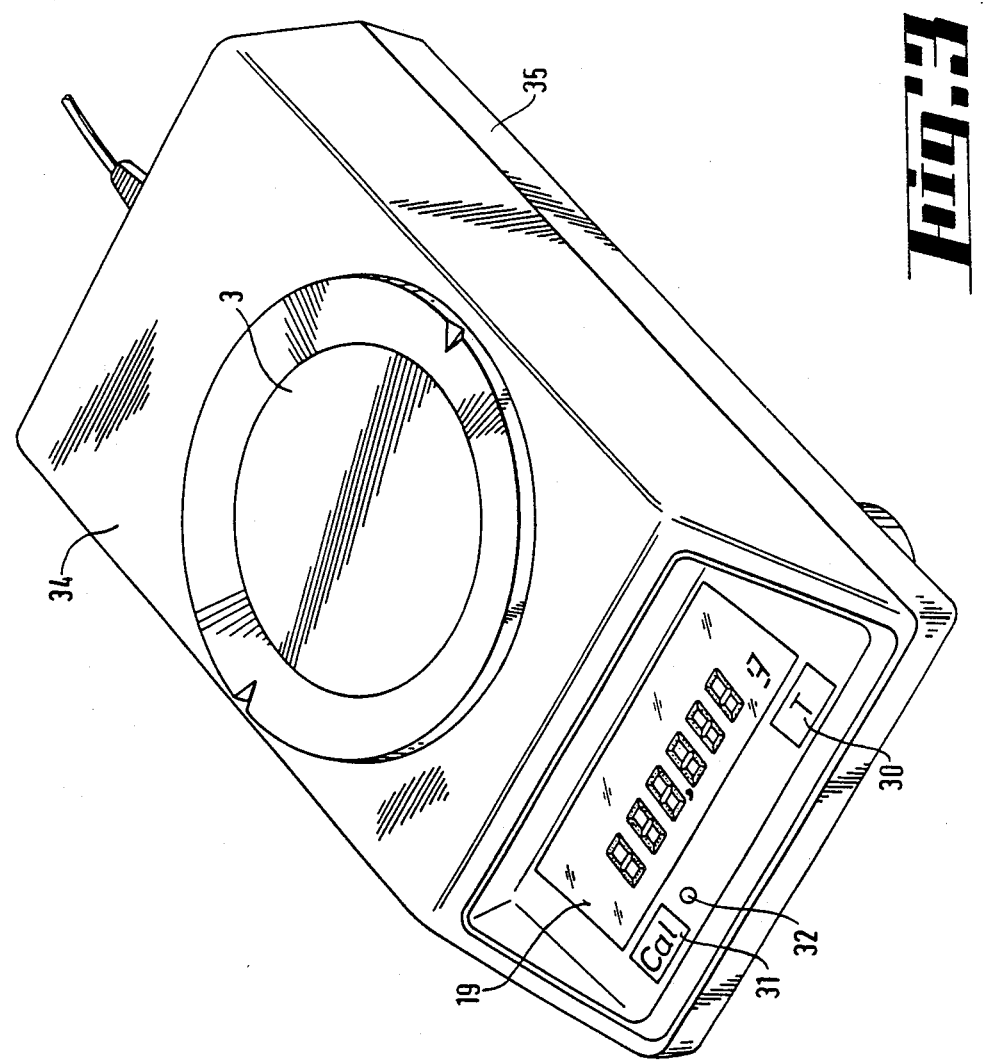

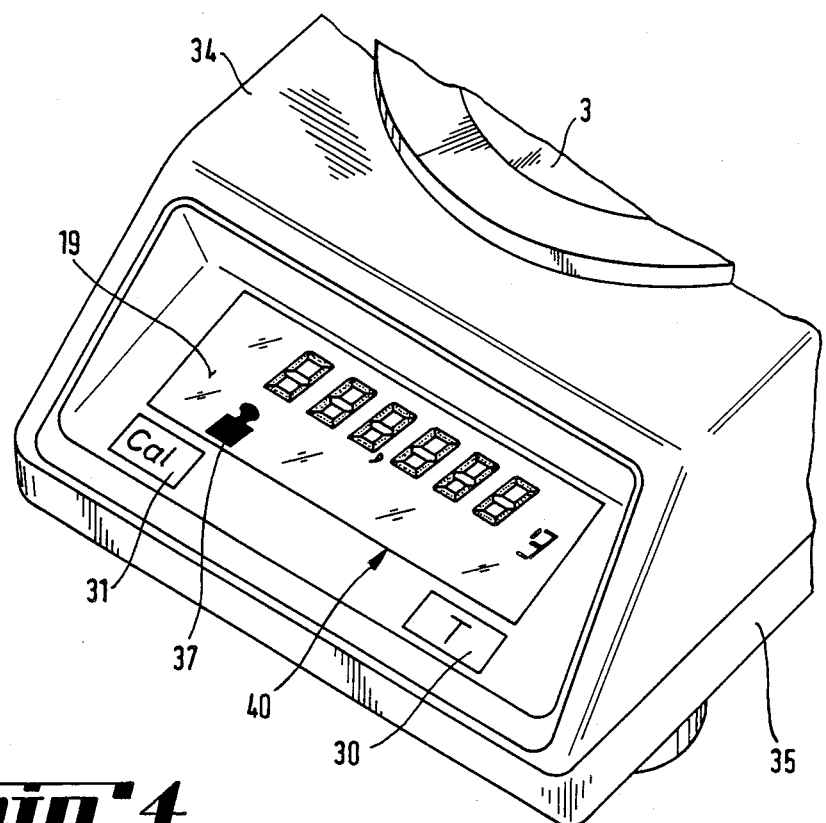

ELECTRONIC BALANCE WITH CALIBRATING SYSTEM

BACKGROUND OF THE INVENTION

The invention relates to an electric balance with a weight measured value sensor, having a temperature sensor for correcting temperature-dependent errors of the weight measured value sensor. The invention also has a built-in calibrating weight, with a device which can bring the calibrating weight into operative connection with the weight measured value sensor, with a display and control panel and with a microprocessor/digital signal processing unit which comprises a memory means for storing a calibrating factor.

Balances of this type are generally known and are described, for example, in DE-OS 31 44 103. A correction of temperature-dependent errors is not mentioned therein. However, this correction is likewise known, e.g. from DE-OS 32 13 016 or DE-OS 33 40 512.

The concept "calibrating weight" is intended to signify not only calibrating weights which act directly by virtue of their force of weight on the weight measured value sensor but also so-called "calibrating levers" in which the one-sided overweight of a rotatably mounted system exerts a defined force on the weight measured value sensor. Such calibrating levers are likewise described in the already-mentioned DE-OS 31 44 103.

A disadvantage of these known prior art constructions is the fact that the operator does not receive any instructions about when a new calibrating process is necessary. The operating instructions can only furnish general data but can not go into detail about the particular conditions for setting up the individual balance, so that in general one calibration per day was recommended.

The invention has the object of making available for the operator of the balance better and more appropriate information about any change of the balance sensitivity which may have occurred since the last calibration and to alert him as to when calibration should be reperformed or by use of the controlling microprocessor actually have the device automatically initiate and perform the calibration.

SUMMARY OF THE INVENTION

The invention achieves the object as follows: In a balance of the type initially mentioned, another memory area is present in addition within the digital signal processing unit. The output signal of the temperature sensor present during the calibrating process is stored in this other memory area, a signal element is present in the display and operating panel and a comparator is present in the microprocessor/digital signal processing unit which comparator (microprocessor software initiated) compares the instantaneous output signal of the temperature sensor with the temperature value stored in this other memory area and which actuates a signal element as soon as this difference exceeds a given amount. The signal element tells the operator when a new calibration should be performed.

Thus, the temperature is constantly monitored as a main disturbance variable and if the temperature has changed since the last calibrating process by more than a certain amount, a warning signal from such type of signal element is emitted, wherewith the operator is requested to perform another calibration. This warning signal can be a light-emitting diode in a first advantageous embodiment which lights up or starts to blink. In a second advantageous embodiment the warning signal can consist of a symbol, e.g. a weight piece, which is actuated (persistently or in a blinking manner) on a display panel.

In addition, in an advantageous further development the microprocessor/digital signal processing unit can comprise an elapsed time indicator which is set back to zero at the occurrence of each calibrating process. In a first embodiment the signal element is likewise actuated as soon as this elapsed time indicator has reached a given value. This causes the operator to be requested to perform another calibration independently of: (1) temperature changes and (2) the comparator signal dependent on said temperature data, at the expiration after a set operating time. In another embodiment the elapsed time indicator reduces the given amount by which the instantaneous output signal of the temperature sensor must differ from the value in the other memory area of said microprocessor in order to actuate the signal element as the operating time since the last calibration event increases. Thus, if only a brief time has elapsed since the last calibration, a large temperature change is required to initiate the actuation of the signal element, whereas after a longer time, even smaller variations in temperature suffice to actuate the signal element until finally the given amount is reduced to zero, wherewith the signal element is also actuated at constant temperature conditions.

Another very important advantageous further development provides that the microprocessor/digital signal processing unit actuates not only the signal element but also directly actuates the motor of the calibrating device and initiates and performs a new calibration producing a new calibration factor which is stored in said unit.

BRIEF DESCRIPTION OF THE INVENTION

The invention is described in the following with reference made to the schematic figures.

FIG. 3 shows a perspective view of the balance in a first embodiment.

FIG. 4 shows the display area of the balance in a second embodiment.

DETAILED DESCRIPTION OF THE INVENTION

Figure 1:
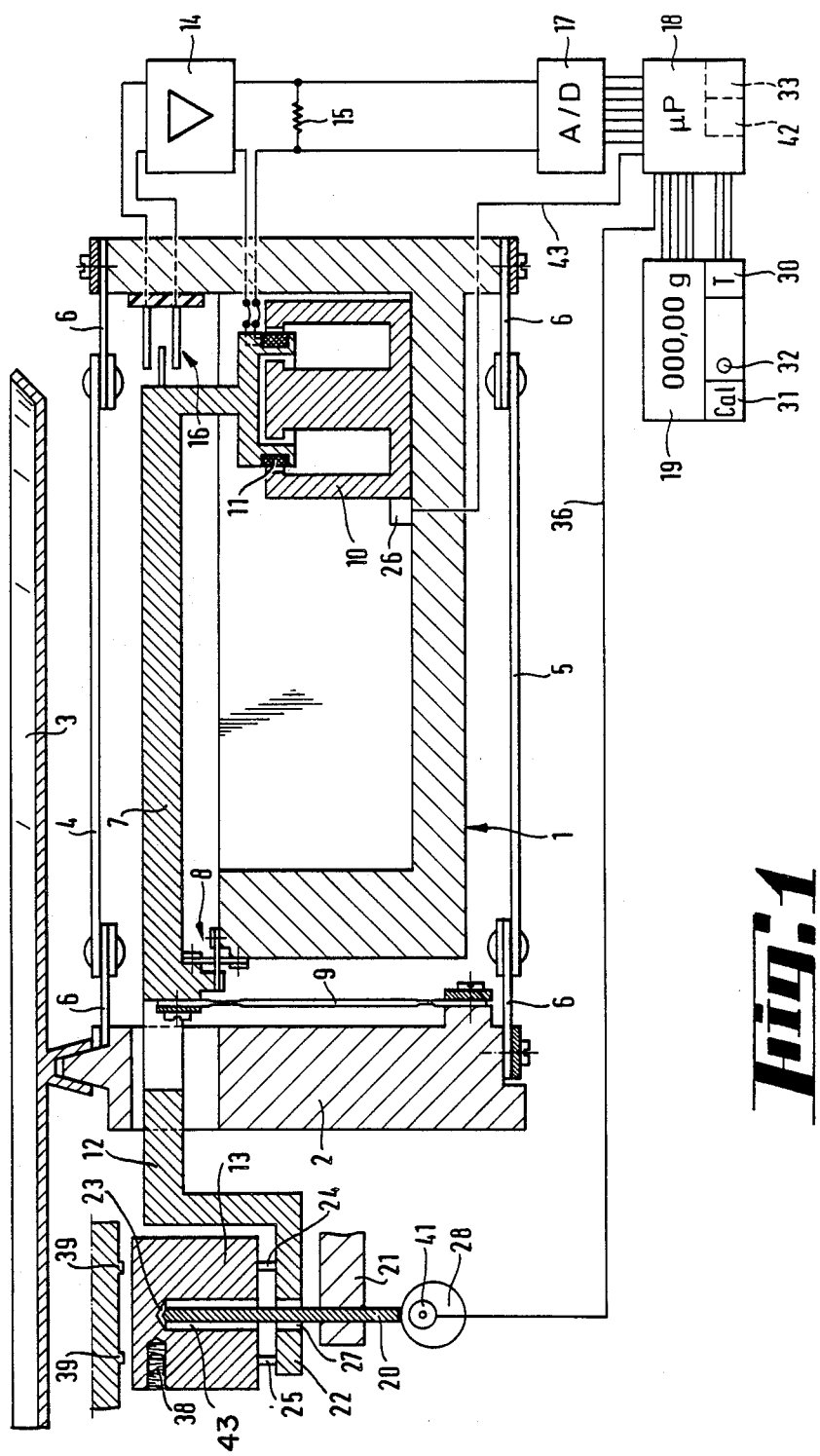
FIG. 1 shows a section through the balance and a block diagram of the associated electronic components.

The electric balance shown in FIG. 1 consists of a system carrier 1 permanently fixed to the housing to which carrier a load receiver 2 is fastened in a vertically movable manner via two guide rods 4, 5 with moving joints 6. Load receiver 2 carries load scale 3 in its upper part for receiving the material to be weighed and transmits the force corresponding to the mass of the material to be weighed via coupling element 9 to the load arm of translation lever 7. Translation lever 7 is mounted to system carrier 1 by means of cross spring joint 8. An electromagnetic coil shell with coil 11 is fastened to the compensation arm of translation lever 7. Coil 11 is located in the air gap of permanent magnet system 10 and generates the compensation force. The magnitude of the compensation current through coil 11 is regulated in a known manner by position sensor 16 and by servo amplifier 14 in such a manner that equilibrium prevails between the weight of the material to be weighed and the electromagnetically generated compensation force. The compensation current generates a measuring voltage on measuring resistor 15 which is fed to analog-digital converter 17. The digitized result is taken by microprocessor/digital signal processing unit 18 and displayed digitally in display 19. Moreover, temperature sensor 26 is present which both senses and converts the temperature of this measured value sensor into a digital signal and then feeds this digital signal via lead 29 to microprocessor/digital signal processing unit 18. Digital signal processing unit 18 can mathematically correct temperature errors of the weight measured value sensor therewith.

The load arm of translation lever 7 is extended (12) beyond the fastening point of coupling element 9 and ends in a downwardly-bent part 22. Three vertical centering pins are fastened to part 22 of which only the two centering pins 24, 25 can be seen in FIG. 1. These centering pins carry calibrating weight 13. The calibrating weight comprises a bore 43 rising from below which ends in conical area 23. This bore runs precisely through the center of gravity of the calibrating weight, so that the conical area is located vertically over the center of gravity of the calibrating weight.

Moreover, a lifting device for the calibrating weight is indicated in FIG. 1 which consists of a prong 20 movably guided in a vertical direction in casing 21 fixed to the housing. The device for moving the prong is indicated only by cooperating elements eccentric 28 and electromotor 41. Prong 20 extends through hole 27 in part 22 into bore 43 in calibrating weight 13. In the position shown, in which the calibrating weight rests on the centering pins and therewith on translation lever 7/12/22, prong 20 ends with its conical tip just below conical area 23. If the prong is raised by rotating eccentric 28, it makes contact with conical area 23, lifts calibrating weight 13 off of the translation lever and presses it against stops 39 fixed to the housing. This is the normal position of the calibrating weight (normal weighing position), whereas the lowered position shown in FIG. 1 is only assumed for the calibrating process. The center of gravity of calibrating weight 13 can be slightly shifted by means of screw associated with 28, which makes it possible to achieve a fine adjustment. Eccentric 28 can be rotatably actuated either manually or by a motor. The latter is provided in FIG. 1.

After key 31 has been actuated, microprocessor/digital signal processing unit 18 starts motor 41 via lead 36, waits for the measured value of the balance (standstill) to come to rest after calibrating weight 13 has been placed on translation lever 7/12/22, assumes the value, also inputs the value of the digital temperature sensor 26 into said microprocessor calculates and stores the new calibrating factor and activates the motor 41 to raise the calibrating weight back into the normal weighing position. The calibration factor indicates the conversion "digit from A/D converter" into "mass units (e.g. grams)". If the calibration weight is e.g. 200,000 g and if the A/D converter outputs an output signal of 357081 digits when the calibration weight is put on, then the calibration factor is 200,00 g/357081 digits=0.000560097 g/digit.

The previously described parts of the balance are known as state of the art and their design and operation are therefore described only quite briefly.

Furthermore, the electric balance of FIG. 1 comprises a memory area 33 within microprocessor/digital signal processing unit 18 in which the digital output signal of temperature sensor 26 is stored during the calibrating process. Thus, not only the new calibrating factor is calculated and stored during calibration but also the digitized temperature signal at this particular point in time. Moreover, a microprocessor/digital comparator is present in digital signal processing unit 18 which upon software instruction compares the particular instantaneous output signal of digital temperature sensor 26 with the value stored in memory area 33, namely, with the output signal of temperature sensor 26 at the last calibrating process. If the difference between the instantaneous output signal of temperature sensor 26 and the value stored in memory area 33 exceeds a given amount, e.g. 5° K., then digital signal processing unit 18 actuates light-emitting diode 32 adjacent to key 31 and indicates therewith to the operator that a new calibration is appropriate. In this manner, the operator can set the frequency of the calibrations to suit the individual balances. A balance located at a positio with greater variations in temperature will actuate calibrating signal 32 more frequently, therewith requesting a calibration more frequently than a balance located in an environment with constant temperature.

Figure 2:
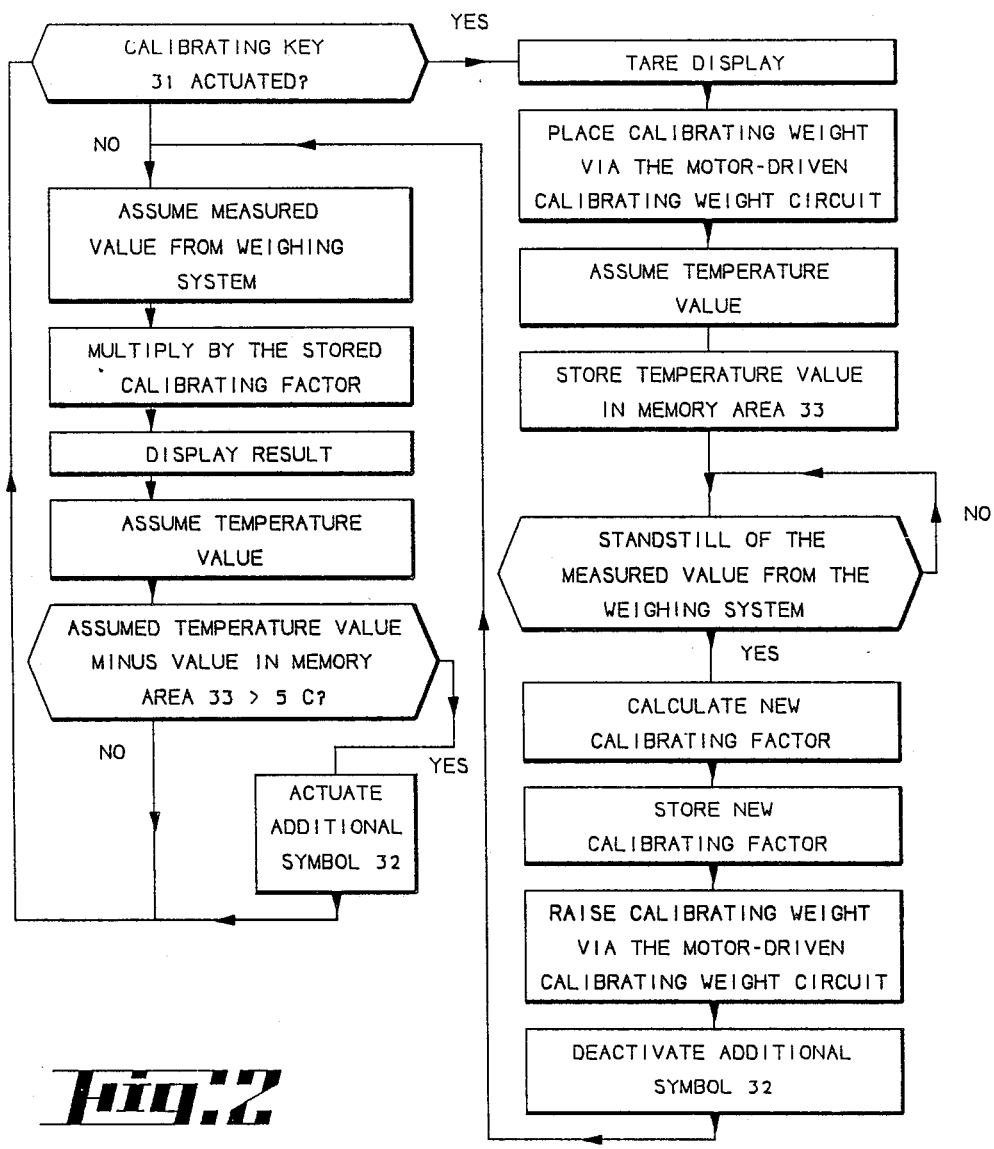
FIG. 2 shows a flow chart of the calibrating process and of the monitoring of the output signal of the temperature sensor.

The method of operation just described and particularly involving the microprocessor/digital signal processing unit and the software of the invention is shown in FIG. 2 as a flow chart. Details and operations which are unessential for the invention are not given. A comparison operation is a normal software instruction command with 2 operand addresses.

If calibrating key 31 is actuated, any value present in the display is tared and the built-in calibrating weight is caused to be placed. Furthermore, the output signal of the temperature sensor is transmitted and stored in memory 33. After the standstill of the measured value from the weighing system has been waited for, the measured temperature value is transmitted and the new calibrating factor calculated from it. (The old calibrating factor is cancelled thereby). Then, the calibrating weight is raised back into the weighing position and actuation of additional symbol 32 present is cancelled.

The normal weighing program then follows, which is performed even if the calibrating key has not been actuated: The measured weight value is transmitted from the weighing system, multiplied by the stored calibrating factor and the result is displayed. Then, the output signal of temperature sensor 26 is assumed and compared with the value stored in memory area 33. If the difference is greater than 5° C., additional symbol 32 is actuated. A new cycle begins with the subsequent inquiry of calibrating key 31.

FIG. 3 is a perspective view of the exterior of the balance. It shows balance scale 3, the housing with bottom part 35 and upper part 34, display 19 of the weighing result, tare key 30, key 31 for initiating the calibrating process and light-emitting diode 32 as signal element.

FIG. 4 shows the display area of the balance in another embodiment. The parts which are the same as in FIG. 3 are designated with the same reference numerals. The signal element is integrated in this embodiment as display symbol into display panel 40 and has the form of a weight piece 37. Display field 40 is e.g. a fluorescent display or an LCD display. The operation is described just as it was for FIGS. 1, 2.

It is advantageous in both embodiments if the signal element is not actuated statically but rather in a blinking fashion.

The previously described actuation of the signal element at rather great variations in temperature can be supplemented by actuation after a certain operating time since the last calibration. To this end, elapsed time indicator 42 is operationally present in microprocessor/digital signal processing unit 18 which is reset to zero at each calibrating process and which actuates signal element 32 or 37 when a given operating time, e.g. 1000 hours, has been reached. In this manner, signal element 32 or 37 is actuated and the operator requested to perform a new calibration even at a constant ambient temperature of the balance after a given time.

In another advantageous embodiment the reading of elapsed time indicator (memory) 42 influences the given amount by which the instantaneous output signal of the temperature sensor must differ from the value in the other memory area 33 in order to initiate the actuation of signal element 32 or 37; an increasing operating time since the last calibration results in a decrease of the given amount. For example, this given amount, expressed in °K., could be equal to the difference $10 - t/100$ (t=operating time in hours since the last calibration). Then, the signal of temperature sensor 26 would have to deviate by 10° K. from the stored temperature signal in memory 33 directly after a calibration in order to initiate the actuation of signal element 32 or 37. After 500 hours, signal element 32 or 37 would be actuated already if the signal of temperature sensor 26 would deviate by more than 5° K. from the value stored in memory 33. And after 1000 hours, signal element 34 or 37 would also be actuated at a constant temperature. This cited connection between the operating time since the last calibration and the temperature limit is of course only an example; various, perhaps even non-linear relationships are appropriate, depending on the special qualities of the balance type.

If other sensors for other physical magnitudes which would affect the elements of the scale are also present in the balance in addition to the temperature sensor, then these physical magnitudes can of course also be monitored in the same manner. If, for example, a moisture sensor is present in the balance, signal element 32 or 37 can be actuated when a certain moisture change since the last calibrating process is exceeded; or, if a level sensor is present in the balance, signal element 32 or 37 can be actuated when a certain change in the placement level since the last calibrating process is exceeded; etc.

Furthermore and quite importantly, it is also possible that microprocessor digital signal processing unit 18 actuates not only signal element 32 or 37 but also concurrently directly actuates motor 41 of the calibrating device via lead 36 and initiates a new calibration. It is of course a necessary preamble, for example, to monitor the balance until zero load and until standstill before a new calibration is actually initiated. Any expert in the art can design the software of microprocessor/digital signal processing unit 18 in this advantageous manner; therefore, no detailed description is necessary here.

What is claimed is:

1. An electronic balance scale having a built-in calibrating system comprising:
    a weight-measured value sensor,
    a temperature sensor having a real time digital output,
    a built-in calibrating weight, said weight being operably moved into a sole-weight-to-be-measured position upon an initiation of a calibration event,
    a microprocessor/digital signal processing unit,
    said unit comprising:
        a mathematical computation unit,
        a memory unit having a plurality of memory areas for storing at least magnitudes, including a first, second, third, a preset-difference memory area, and at least one other memory area,
        a comparator unit to compare the magnitude of a first memory area compared to that of a second memory area and indicate in a third memory area which magnitude of said first and second memory areas is larger and by what magnitude of difference,
    a memory with a built-in program of instructions,
    a calibration factor stored in one of said other memory areas,
    said factor computed at an initiation of a calibration event utilizing only said built-in calibrating weight,
    said digital output of said temperature sensor being inputted into said second memory area, said first memory area storing the temperature digital output of said temperature sensor at the occurrence of the last calibration event,
    a display and operating panel having an actuatable signal element,
    said signal processing unit under control of said program continuously reading said temperature sensor, and by said comparator unit comparing a temperature at said sensor as stored at said second memory area with a temperature as stored at said first memory area and if said difference is greater than a number stored at said preset difference memory area then said signal element is actuated indicating that a new calibration event utilizing only said built-in calibrating weight should be initiated.

2. Electric balance according to claim 1, wherein the signal element is a light-emitting diode.

3. Electric balance according to claim 1, with an LCD display field, wherein the signal element is a symbol in a display field of said display and operating panel.

4. Electric balance according to claim 1, with a fluorescent display field, wherein the signal element is a symbol in a display field of said display and operating panel.

5. Electric balance according to claim 4, wherein the symbol resembles a weight piece.

6. Electric balance according to claim 5, wherein the signal element blinks when actuated.

7. Electric balance according to claim 1 including a preset elapsed time memory wherein an elapsed time indicator is additionally present in the digital signal processing unit, which indicator is reset to zero at every calibrating event.

8. Electric balance according to claim 1 including a preset elapsed time memory wherein an elapsed time indicator is additionally present in the digital signal processing unit, said indicator being read by said instructions, said instructions resetting said indicator to zero upon some predetermined value, as determined by at least said preset elapsed time memry, in said indicator being reached, and said reset event indicating a calibrating event.

9. Electric balance according to claim 8, wherein said digital signal processing unit likewise actuates the signal element upon said reset event.

10. Electric balance according to claim 8, wherein as the reading of the elapsed time indicator increases, the given amount by which the instantaneous output signal of the temperature sensor as stored in said second memory area must differ from the value in said first memory area in order to initiate the actuation of said signal element is decreased.

11. Electric balance according to claim 10, wherein the microprocessor/digital signal processing unit actuates both the signal element and a motor of the calibrating system which operably moves said built-in calibrating weight into sole-weight-to-be-measured position.

12. Electric balance according to claim 1, wherein the microprocessor/digital signal processing unit actuates both the signal element and a motor of the calibrating system which operably moves said built-in calibrating weight into sole-weight-to-be-measured position.

* * * * *